US011891746B2

(12) United States Patent
Prabhakaran

(10) Patent No.: US 11,891,746 B2
(45) Date of Patent: Feb. 6, 2024

(54) HOUSEHOLD APPLIANCE WITH A LID ASSEMBLY

(71) Applicant: WHIRLPOOL CORPORATION, Benton Harbor, MI (US)

(72) Inventor: Raghavendran Prabhakaran, Tamil Nadu (IN)

(73) Assignee: Whirlpool Corporation, Benton Harbor, MI (US)

( * ) Notice: Subject to any disclaimer, the term of this patent is extended or adjusted under 35 U.S.C. 154(b) by 80 days.

(21) Appl. No.: 17/566,784

(22) Filed: Dec. 31, 2021

(65) Prior Publication Data

US 2023/0228029 A1 Jul. 20, 2023

(51) Int. Cl.
*D06F 39/14* (2006.01)
*E05D 7/086* (2006.01)
*E05D 11/06* (2006.01)

(52) U.S. Cl.
CPC ............ *D06F 39/14* (2013.01); *E05D 7/086* (2013.01); *E05D 11/06* (2013.01); *E05Y 2900/312* (2013.01)

(58) Field of Classification Search
CPC ......... D06F 39/14; E05D 7/086; E05D 11/06; E05Y 2900/312
USPC ........................................................... 68/196
See application file for complete search history.

(56) References Cited

U.S. PATENT DOCUMENTS 8,444,234 B2 5/2013 Kim et al.
2020/0325609 A1* 10/2020 Ahamad ................ D06F 37/18

FOREIGN PATENT DOCUMENTS

| | | | |
|---|---|---|---|
| BR | PI1002652 | A2 | 3/2012 |
| CN | 202671903 | U | 1/2013 |
| CN | 205893700 | U | 1/2017 |
| CN | 112941843 | A | 6/2021 |
| EP | 2551400 | B1 | 3/2016 |

OTHER PUBLICATIONS

CN202671903U—machine translation (Year: 2013).*

* cited by examiner

*Primary Examiner* — Tinsae B Ayalew
(74) *Attorney, Agent, or Firm* — McGarry Bair PC

(57) ABSTRACT

A lid assembly for an appliance includes a cabinet and a lid frame configured to rotatably mount to the cabinet. The lid assembly can be pivoted between an open position and a closed position. A windowpane can be provided within the lid frame, permitting visual access to the contents of the cabinet.

16 Claims, 11 Drawing Sheets

HOUSEHOLD APPLIANCE WITH A LID ASSEMBLY

BACKGROUND

Household appliances, such as for laundry treatment, can be configured with a cabinet, treatment chamber, and a rotatably-mounted transparent lid. Such transparent lids provide visual access to the treatment chamber during operation as well as physical access for items to be inserted or removed from the treating chamber. Securing a transparent panel within the lid assembly can be accomplished using glue to fix the panel to a frame, sandwiching the panel between layers of the frame, or encapsulating the transparent panel in the frame.

BRIEF SUMMARY

In one aspect, the disclosure relates to a household appliance comprising: a cabinet defining an interior and having a wall with an access opening; a treating chamber located within the interior; a lid assembly selectively closing the access opening and comprising: a frame having at least opposing side members connected by opposing front and rear members to define a window opening, and having a panel recess with a panel slot extending along one of the members; a windowpane received within the panel recess, through the panel slot, and in abutting contact with the member opposite the slot; at least one stop mounted to the frame at the slot and in abutting contact with the windowpane to compressively retain the windowpane between the member opposite the slot and the stop; and a cover mounted to the frame and overlying the at least one stop.

In another aspect, the disclosure relates to a household appliance comprising: a cabinet defining an interior and having a wall with an access opening; a treating chamber located within the interior; a lid assembly selectively closing the access opening and comprising: a frame having a front and a rear connected by opposing sides to define a window opening, and having panel guides on the opposing sides and rear to define a panel slot facing the front; a windowpane slidably received within the panel guides, through the panel slot, and in abutting contact with at least a portion of the panel guide on the rear; at least one stop mounted to the front and in abutting contact with the windowpane to compressively retain the windowpane between the panel guide on the rear and the stop; and a cover mounted to the frame and overlying the at least one stop.

DETAILED DESCRIPTION

Figure 1:
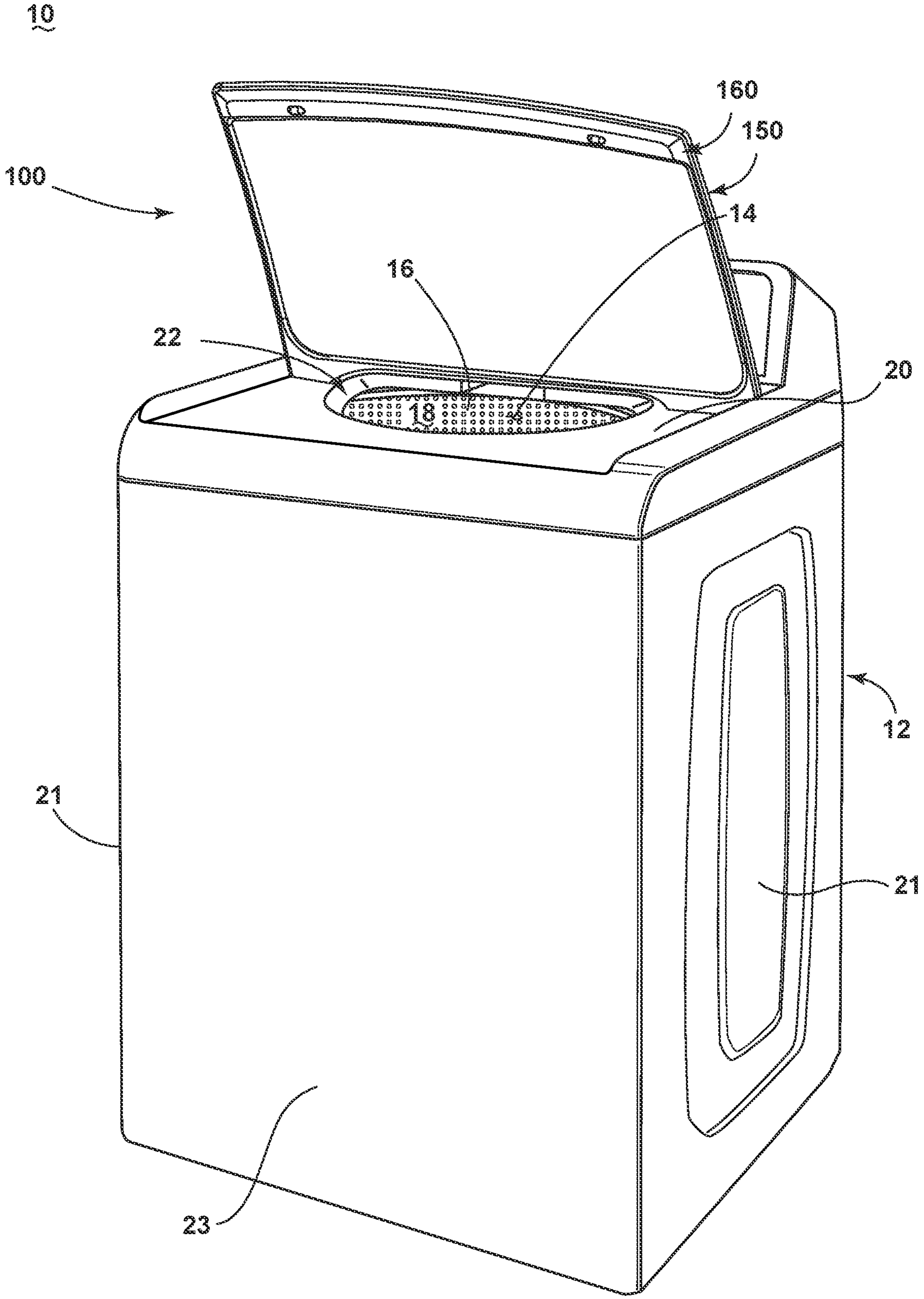
FIG. 1 illustrates a perspective view of an exemplary household appliance having a lid assembly in accordance with various aspects described herein.

Aspects of the disclosure relate to a lid assembly for a household appliance. Lid assemblies for household appliances can include a variety of features and components, including a transparent viewing window area, structures for preventing the passage of liquid through the lid assembly, a closure mechanism, or a locking mechanism, in non-limiting examples. Traditional appliance lid assemblies can include a windowpane sandwiched between frame components, or glued to rotatable components. Assembly of such doors can be complex, requiring additional time or costly materials.

The described aspects of the present disclosure have applicability in a variety of household appliances including, but not limited to, laundry treating appliances, refreshers, dishwashers, or the like. Some non-limiting examples of laundry treating appliances include laundry washing appliances, laundry drying appliances, combination laundry washer/dryers, refreshing/revitalizing machines, extractors, non-aqueous washing apparatuses, or the like. In some examples, laundry treating appliances can be front-loading or top-loading. In some examples, laundry treating appliances can be in a horizontal-axis or a vertical-axis arrangement. Aspects of the disclosure can have applicability to any appliance having a door, whether it be hingedly connected to a cabinet, slidable in or out of a cabinet, or combinations thereof.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, or joined) are to be construed broadly and can include intermediate members between a collection of elements and relative movement between elements unless otherwise indicated. As such, connection references do not necessarily infer that two elements are directly connected and in fixed relation to one another. Furthermore, as used herein, the term "set" or a "set" of elements can be any number of elements, including only one. The exemplary drawings are for purposes of illustration only and the dimensions, positions, order and relative sizes reflected in the drawings attached hereto can vary.

Turning to FIG. 1, one exemplary household appliance 10 is illustrated. The exemplary household appliance 10 is illustrated herein as a laundry treating appliance, such as a washing machine or a laundry dryer, though this need not be the case. In some examples, the household appliance 10 can be any laundry treating appliance that performs a cycle of operation to clean or otherwise treat laundry items placed therein. The household appliance 10 shares many features of a conventional automated clothes washer and/or dryer, which will not be described in detail herein except as necessary for a complete understanding of the exemplary embodiments in accordance with the present disclosure.

The household appliance 10 can include a structural support assembly comprising a cabinet 12 defining an interior 14. In the illustrated example, the cabinet 12 can form a housing within which a laundry holding assembly resides. The cabinet 12 can include a chassis or frame defining the interior 14. The household appliance 10 may further include a rotatable drum 16 supported within the cabinet 12 by a suitable rotation assembly. The drum 16 can rotate about a rotational axis which is shown as a generally vertical axis. The drum 16 can at least partially define a treating chamber 18 for receiving an article for treatment, non-limiting examples of which include a hat, a scarf, a glove, a sweater, a blouse, a shirt, a pair of shorts, a dress, a sock, a pair of pants, a shoe, an undergarment, a jacket, a towel, or an article of bedding. The cabinet 12 can include a top panel 20 with an access opening 22 providing access to the interior 14, such as to the treating chamber 18. The cabinet 12 can include side panels 21 and front panel 23. In some examples, the cabinet 12 can enclose components typically found in a conventional washing machine or drying machine. Conventional washing machine or drying machine components are not described in detail, but are described briefly herein as needed to provide an illustrative environment to support a complete understanding of aspects of the present disclosure.

In the example shown, the lid assembly 100 can selectively open and close the access opening 22 to the treating chamber 18. In the example shown, the lid assembly 100 can include a lid frame 150 pivotally mounted to the cabinet. The lid frame 150 can be movable between an open position (shown in FIG. 1) and a closed position (not shown), where the lid frame is generally horizontal and forms a top of the appliance. While the lid assembly 100 is shown on a top surface, the lid assembly can be used on side wall surface, as a door. A front or handle portion 160 can also be provided for opening and closing of the lid assembly 100. The handle portion 160 can be part of the frame 150 as illustrated, or it can be separate from the frame 150. A transparent viewing window such as a windowpane 110 can be provided with the lid assembly 100 for viewing portions of the treating chamber 18 when the lid assembly 100 is closed. While described as transparent, all or part of the windowpane 110 need not be transparent. Some or all of the windowpane can be translucent or opaque, as well as transparent. The windowpane can also be of different colors.

Figure 2:
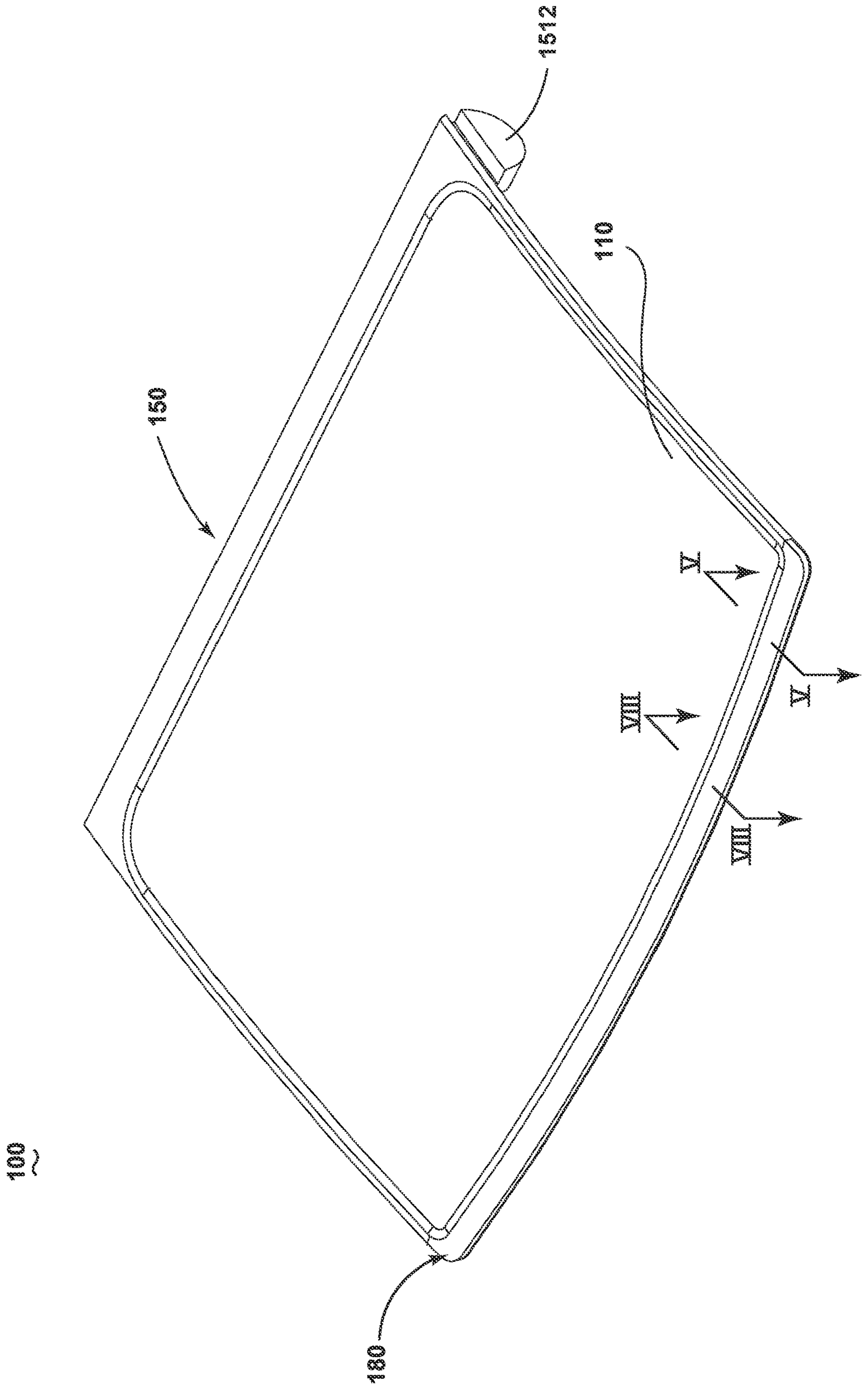
FIG. 2 illustrates a top perspective view of the lid assembly of FIG. 1.

Turning to FIG. 2, the lid assembly 100 is shown in further detail. The lid frame 150 can be pivotally opened or closed about a hinge assembly 151 that is connected to the cabinet 12. A windowpane 110 can be carried by the lid frame 150 as shown. The windowpane 110 can include any suitable transparent or semi-transparent material, such as glass or a polymeric material, or a composite material. Some non-limiting examples of materials include tempered glass, acrylic, polycarbonate, or the like, or combinations thereof. The thickness of the windowpane 110 can be of any suitable thickness. For a household appliance application, especially a clothes washer, it is contemplated the thickness is within the range of 3-4 mm (0.11 to 0.16 inches), for example, 3.1-3.2 mm (0.12 to 0.13 inches).

Figure 3:
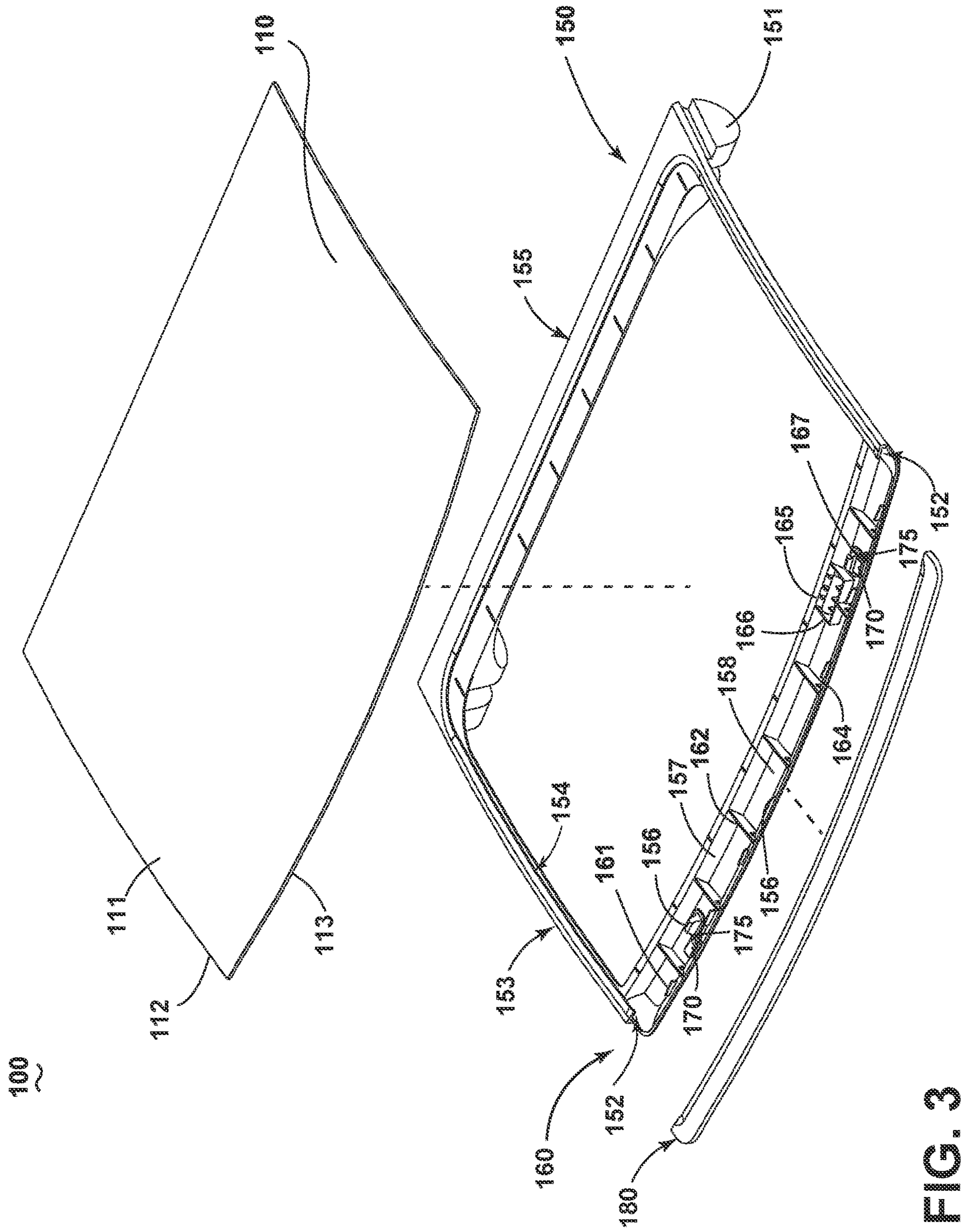
FIG. 3 illustrates a partially exploded view of the lid assembly of FIG. 1 in accordance with various aspects described herein and illustrating a windowpane separated from a frame, with the frame having a handle cover.

FIG. 3 illustrates one example of the lid assembly 100, including the windowpane 110, lid frame 150, a set of stops 170, and a handle cover 180. The windowpane 110 can include an upper side 111, a lower side 113, and a peripheral edge 112 extending between the upper side 111 and the lower side 113. The lid frame 150 can include opposing side members 153 and a rear member 155. The lid frame 150 can include a front member or a handle portion 160 opposite the rear member 155. The handle portion 160, side members 153, and rear member 155 are connected and define a window opening to the treatment chamber 18. The hinge assembly 151 can be located adjacent the rear member 155.

A panel slot 152 provides an entrance to a recess or a panel guide 154 extending around at least a portion of the frame 150. For example, the panel guide 154 can extend around side members 153 and rear member 155. The peripheral edge 112 of the windowpane 110 can be slidably received through the panel slot 152 to be received in the panel guide 154. The windowpane 110 can thus be held in abutting contact with the member 153, opposite the panel slot 152. In other words, the windowpane 110 can be inserted through the panel slot 152 and retained in the lid frame 150 by the panel guide 154. While the panel slot 152 is illustrated as facing the handle portion 160, it is contemplated that the panel slot 152 can optionally face a side member 153 or the rear member 155.

In one non-limiting example, the handle portion 160 extends beyond the windowpane 110. As shown in FIG. 3, the handle portion 160 can include a front wall 156, a back wall 157, and a recessed floor 158 extend between the front wall 156 and the back wall 157. A set of angled projections 161 can be provided as extending upward from the front wall 156. A center rib 162 can be included in each of the set of angled projections 161. A set of stabilizing partitions 163 having holes 164 can be provided as extending between the front wall 156 and back wall 157. The set of angled projections 161 and stabilizing partitions 163 mate with the handle cover 180 when assembled and provide stabilizing interactions.

A magnet 165 held by a magnet holder 166 can be secured to the recessed floor 158 anywhere along the length of the recessed floor. Alternatively, the magnet 165 and magnet holder 166 can be in one of the side members 153 or rear member 155. When the lid assembly 100 is in the closed position, the presence of the magnet 165 is in proximity to the cabinet and signals the controller that the lid assembly 100 is in the closed position. A set of bumpers 167 extends through a corresponding set of openings 159 (not shown) in the recessed floor 158.

A set of stops 170 can be provided with the handle portion 160. A set of retainers 175 corresponding to the set of stops 170 can be located within the handle portion 160. The set of retainers 175 can be provided as extending upward from frame 150, for example at the junction of the front wall 156 with the recessed floor 158. When the handle cover 180 is assembled with the lid frame 150, the angled projections 161, stabilizing partitions 163, magnet 165 and magnet holder 166, set of stops 170 and retainers 175 can be enclosed between the handle cover 180 and the lid frame 150 and obscured from view. Additionally and alternatively, the sets of stops 170 and retainers 175 can be included in a side member 153 or rear member 155.

Figure 4:
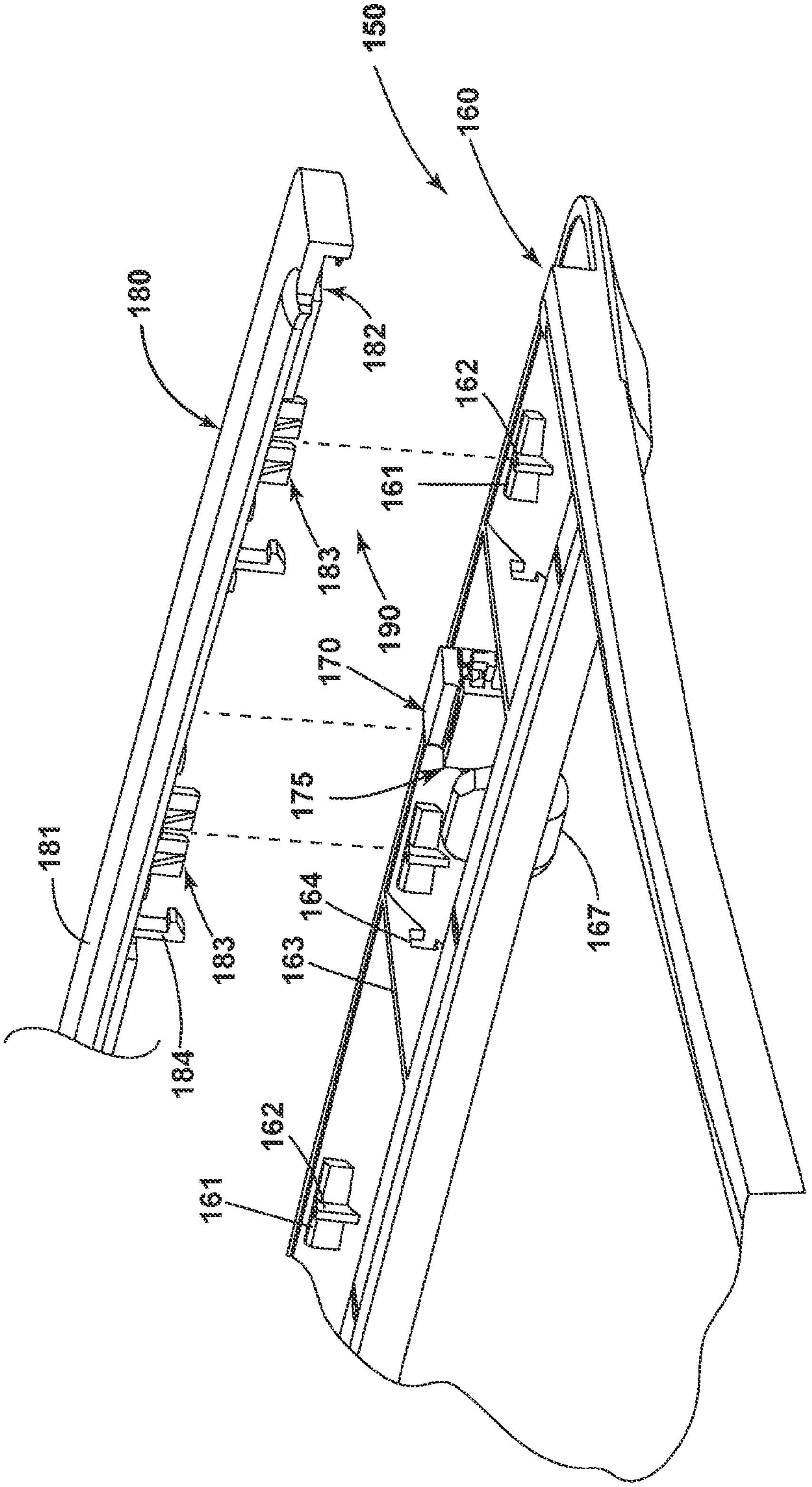
FIG. 4 illustrates an enlarged, rear view of a portion of the frame of FIG. 3 with the windowpane removed for clarity.

Details of the handle cover 180 are illustrated in FIG. 4 including alignment elements 190. Included in handle cover

Figure 5:
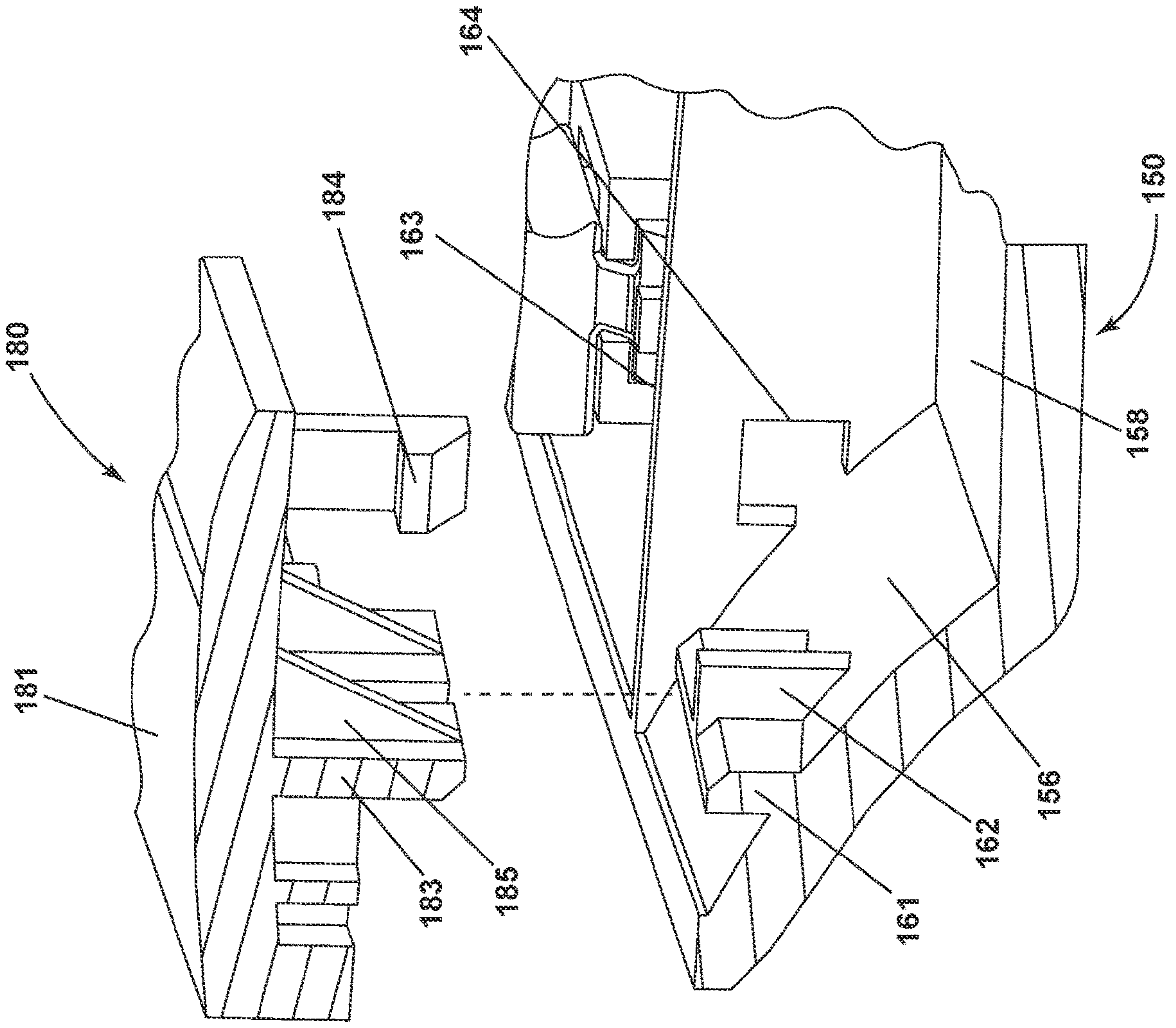
FIG. 5 illustrates a cross-sectional perspective view of the lid assembly of FIG. 2 with the handle cover lifted, in accordance with various aspects described herein.

180 are an optionally smooth outer surface 181 and a lower surface 182 spaced and opposite the outer surface 181. The alignment elements 190 can include a set of brackets 183 extending downwardly from the lower surface 182 as well as the angled projections 161 and center ribs 162. In an enlarged view, FIG. 5 illustrates the alignment of the handle cover 180 with the lid frame 150. The set of brackets 183 can line up with the angled projections 161. Specifically, the set of brackets 183 can align with the center ribs 162 of the angled projections 161. The handle cover 180 can include a set of hooks 184 extending from the lower surface 182 that correspond to the holes 164. Any reasonable number of holes 164 can be included in the frame 150. Gussets 185 can be included to extend between the lower surface 182 and brackets 183.

Figure 6:
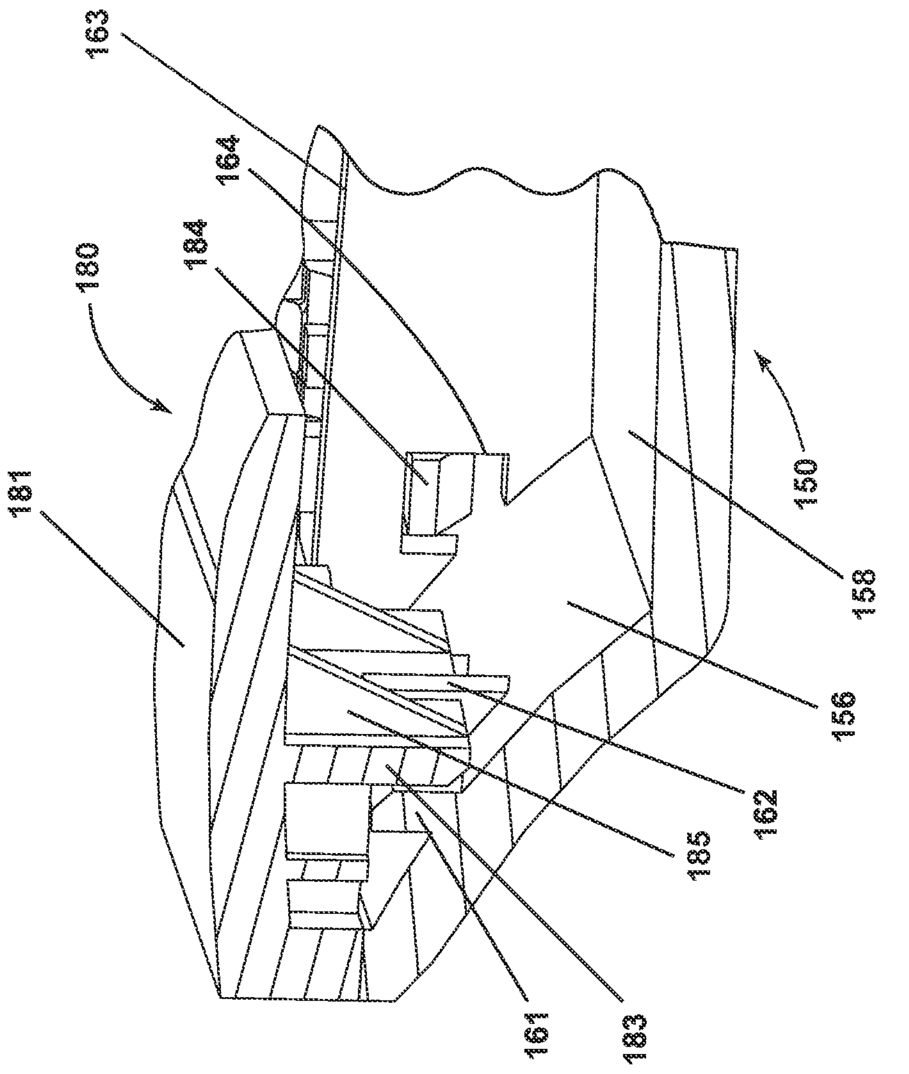
FIG. 6 illustrates a cross-sectional perspective view of the lid assembly of FIG. 2 with the handle cover attached, in accordance with various aspects described herein.

As shown in FIG. 6, when the handle cover 180 is assembled with the lid frame 150, the hooks 184 snap fit with the holes 164 to secure the handle cover 180 to the lid frame 150. The angled projections 161 abut the brackets 183 providing stability to the lid assembly 100 against vibration and to rigidly hold the lid frame 150 together with the handle cover 180. The angled projections 161 and brackets 183 are aligned to confront each other when the handle cover 180 is secured to the handle portion 160. The gussets 185 brace the brackets 183 against the lower surface 182 when downward forces are applied. The alignment elements 190 can be used to ensure the handle cover 180 is properly aligned with and securely fixed to the frame 150 during assembly. It should be appreciated that the alignment elements 190 need not be brackets 183 that receive angled projections 161, but can take similar forms that can be included within the scope of this disclosure.

Figure 7A:
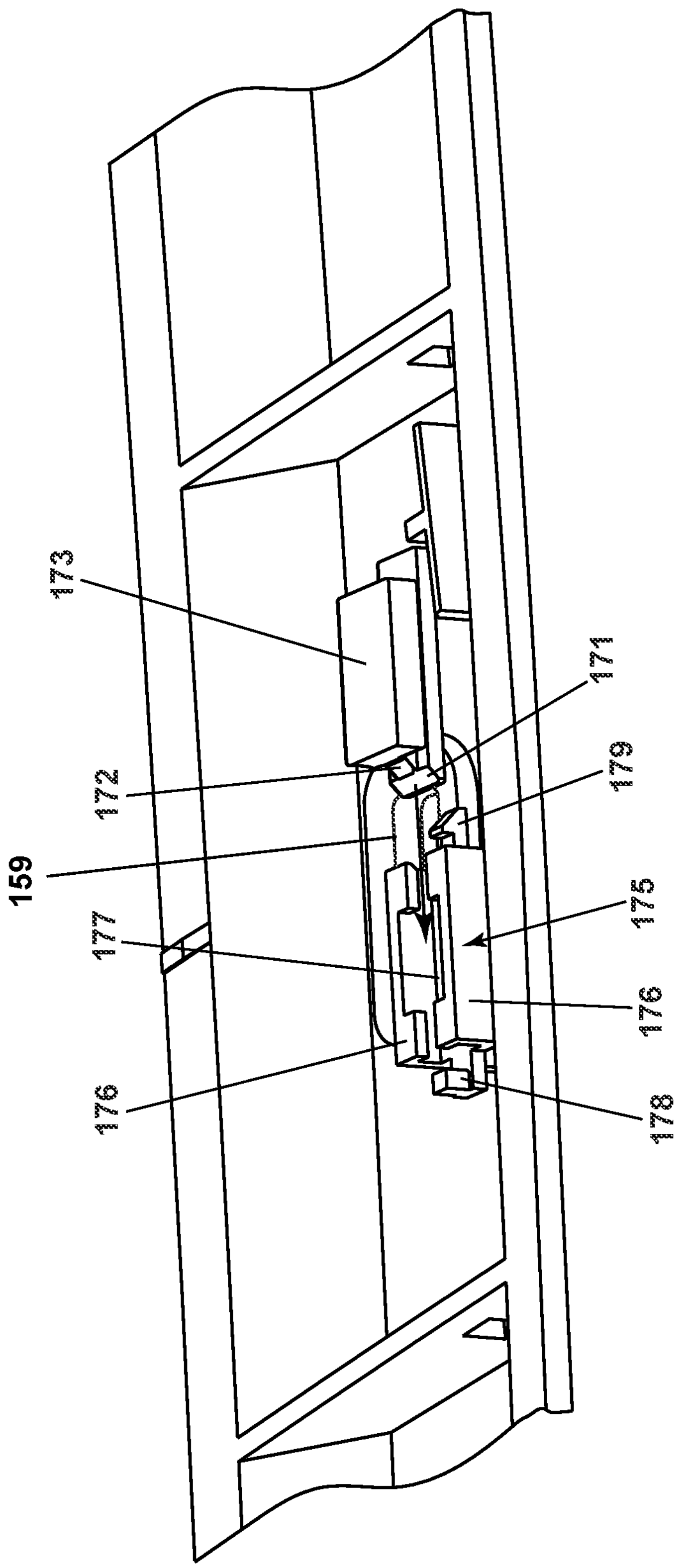
FIG. 7A illustrates an enlarged view of a portion of the lid assembly of FIG. 3 showing the stop in a first position and the bumper removed for clarity, in accordance with various aspects described herein.

Turning now to FIG. 7A, an enlarged view of one of the set of stops 170 and retainer 175 shows the stop 170 in the lid frame 150 in a first position, with the handle cover 180 and bumper 167 removed for clarity. The retainer 175 can, for example, have the form of a channel 176 with a predetermined cross-sectional shape where the stop 170 has at least a portion with a complementary cross-sectional shape to the channel 176 such that the stop 170 can be slid into the channel 176. In one non-limiting example, the stop 170 can include a support 171 and a top 173 with a stem 172 extending between the support 171 and top 173. The stem 172 can be substantially narrower than the support 171 and the top 173. The channel 176 can include a base surface 177 anchored to the front wall 156 and the recessed floor 158. One end of the base surface 177 is provided with an abutment 178. The opposite end of the base surface 177 can include a tang 179 to snap-fit the stop 170.

Figure 7B:
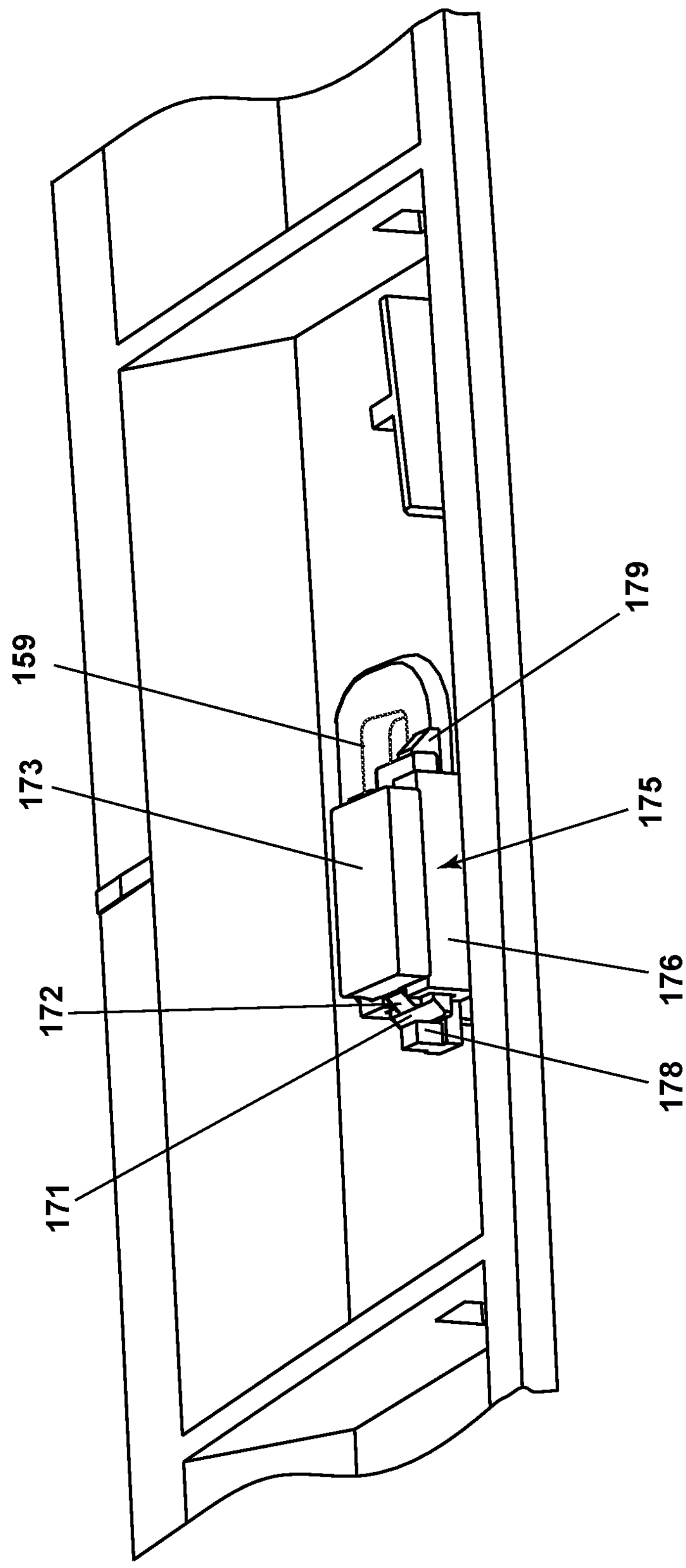
FIG. 7B illustrates an enlarged view of a portion of the lid assembly of FIG. 3 showing the stop in a second position and the bumper removed for clarity, in accordance with various aspects described herein.

FIG. 7B shows the stop 170 and retainer 175 in a second position. When the stop 170 is in the second position, the support 171 lies within the channel 176. In this position, the support 171 confronts the abutment 178 at one end. The tang 179 encloses the support 171 within the retainer 175 in a snap-fit. In this position, the stop 170 compressively retains the windowpane 110 against the rear of the frame 150.

Figure 8:
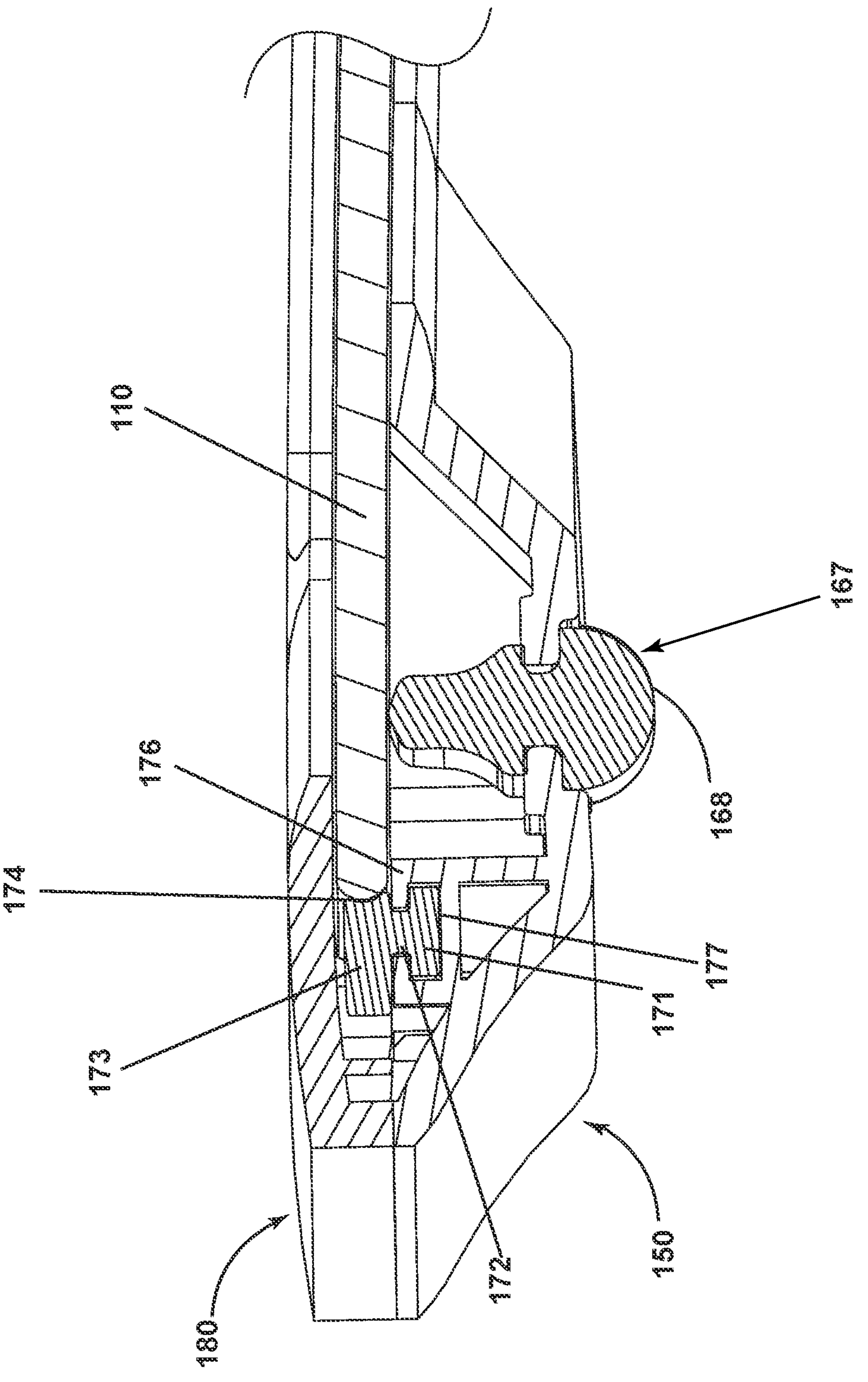
FIG. 8 illustrates a cross-sectional view of the lid assembly of FIG. 2 showing the profile of the stop and the bumper, in accordance with various aspects described herein.

A cross-sectional view shown in FIG. 8 illustrates details of the stop 170 and retainer 175 in the second position. The top 173 is provided with a side surface 174 that confronts the windowpane 110 when assembled. The side surface 174 can be curved or otherwise shaped such that the shape of the side surface 174 is complementary to the shape of the peripheral edge 112 of the windowpane 110. The support 171 is retained within the channel 176 thereby fitting the stop 170 to the lid frame 150. The stop 170 can be one piece, simplifying assembly and reducing cost.

An exterior portion 168 of the bumper 167 is exposed outside of the lid assembly. When the lid assembly is in a closed position, the exterior portion 168 rests on the top panel 20. The bumper 167 can be one piece, simplifying assembly and reducing cost.

Figure 9:
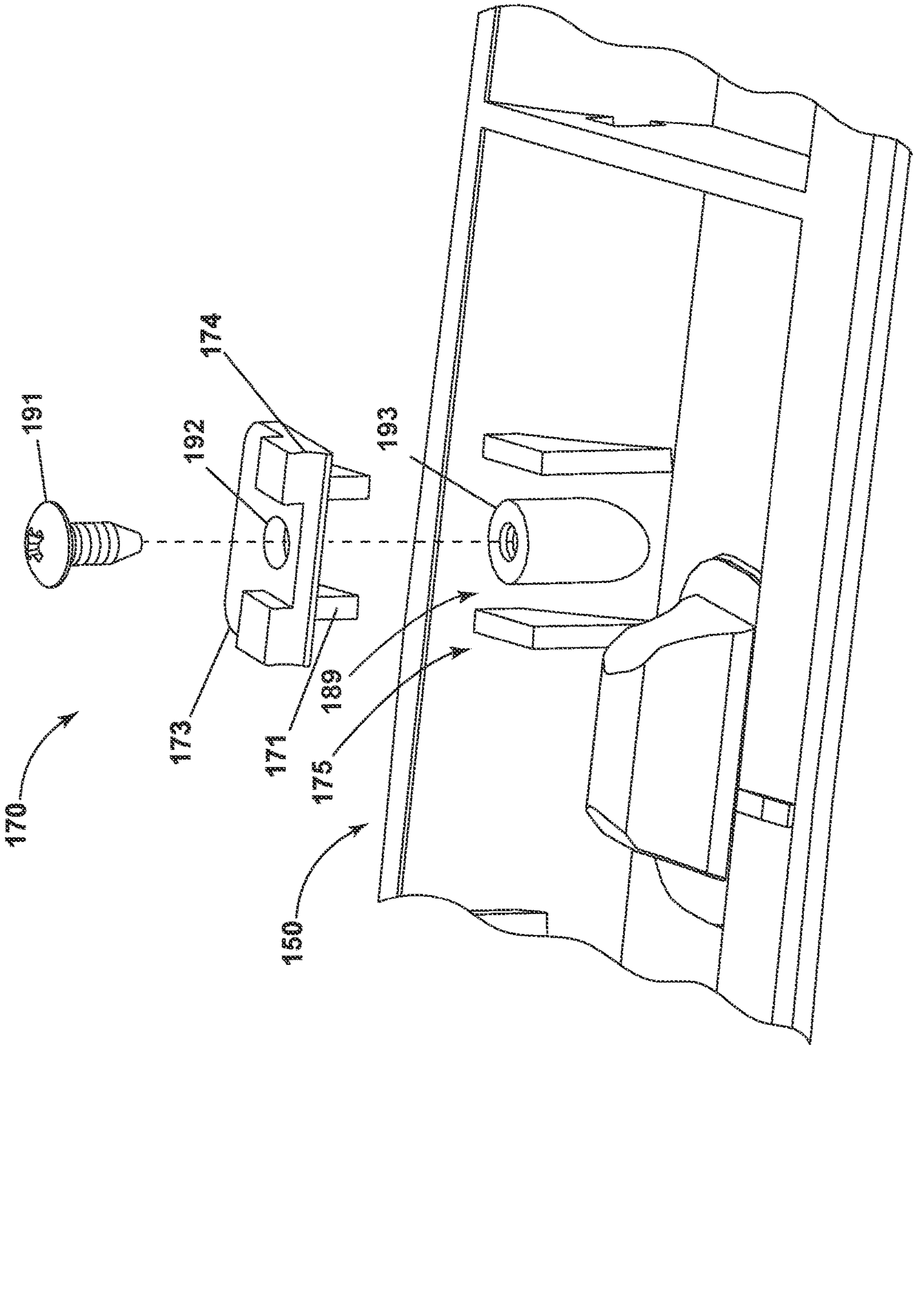
FIG. 9 illustrates a partially exploded, enlarged rear view of a portion of the lid assembly of FIG. 2, in accordance with various aspects described herein.
Figure 10:
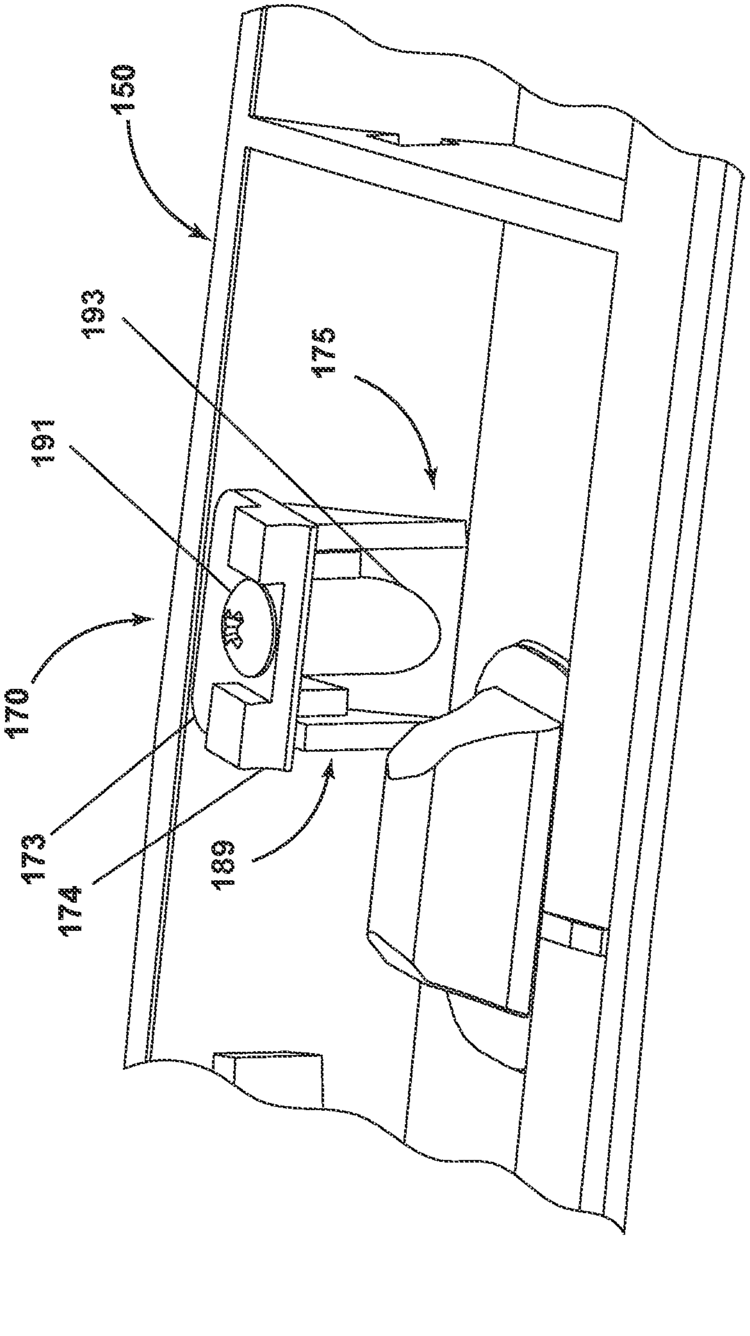
FIG. 10 illustrates an enlarged, rear view of a portion of the lid assembly of FIG. 2 including the stop, in accordance with various aspects described herein.

In one non-limiting example, the support 171 is illustrated in FIGS. 7-8 as having a solid block shape, however, alternative shapes are possible within the scope of this disclosure. In one non-limiting example, as shown in FIG. 9 the retainer 175 can take the form of a seat 189 anchored to the frame 150 and configured to receive the stop 170. The support 171 can have a complementary shape such that it fits within the seat 189. In an aspect according to the disclosure herein, the stop 170 can be secured to the seat 189 by a mechanical fastener 191 as illustrated in FIGS. 9-10. In some examples, the top 173 can include an opening 192 for the fastener 191. In this case, the retainer 175 can include a threaded post 193 or other means of receiving any commonly used mechanical fastener such as a nail, rivet or screw. Additionally, and alternatively, the fit of the stop 170 to the retainer 175 can be an interference fit. In the assembled configuration as shown in FIG. 10, the stop 170 is secured within the retainer 175 by the fastener 191. The stop 170 can also be secured within the retainer 175 by the fit between the support 171 and the channel 176.

In an aspect, the lid assembly can be assembled according to the following steps. The windowpane 110 is aligned with the panel slot and slid into the panel recess or panel guides until it reaches an opposite member such as the rear member. The stop is then positioned to abut the peripheral edge of the windowpane. The stop is slid or inserted into the retainer until a fit position is achieved. The stop is fastened to the retainer by a snap-fit, a mechanical fastener or other suitable means of securement. The handle cover is aligned with and pressed onto the lid frame and fixed by a snap-fit.

Aspects of the disclosure provide for a glass lid assembly. The transparent lid allows the user to view the contents of the appliance during operation. Retaining the glass in a panel guide in the lid frame reduces the number of parts and complexity. The stops suppress motion of the windowpane and act as vibration dampeners, thereby reducing noise and wear. In addition, the stops and snap-fitted handle cover reduce the number of parts, cost, complexity, and assembly time compared to traditional lid assemblies utilizing glue, multiple frames, or other types of fasteners. Aesthetically, the lid assembly has a smooth appearance, as no fasteners are visible.

To the extent not already described, the different features and structures of the various embodiments can be used in combination with each other as desired, or can be used separately. That one feature may not be illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A household appliance comprising:
a cabinet defining an interior and having a wall with an access opening;
a treating chamber located within the interior;
a lid assembly selectively closing the access opening and comprising:
a frame having a channel with a predetermined cross-sectional shape and at least opposing side members connected by opposing front and rear members to define a window opening, and having a panel recess with a panel slot extending along one of the members;
a windowpane received within the panel recess, through the panel slot, and in abutting contact with the member opposite the slot;
at least one stop slidably mounted to the frame at the slot and having a portion with a complementary cross-sectional shape to the channel, and the portion is slid into the channel in abutting contact with the windowpane to compressively retain the windowpane between the member opposite the slot and the stop; and
a cover mounted to the frame and overlying the at least one stop.

2. The household appliance of claim 1, wherein the cover snap-fits to the frame.

3. The household appliance of claim 2 wherein one of the cover or the frame has a set of hooks and the other of the cover or frame has a corresponding set of holes such that the cover is secured to the frame by a snap fit between the holes and the hooks.

4. The household appliance of claim 2, further comprising alignment elements on the cover and the frame to align the cover on the frame.

5. The household appliance of claim 4, wherein the alignment elements comprise a set of brackets on one of the cover or the frame and a corresponding set of angled projections on the other of the cover or frame, wherein the angled projections and brackets are aligned to confront each other when the cover is secured to the frame.

6. The household appliance of claim 1 wherein the frame has a seat and the stop is received within the seat.

7. The household appliance of claim 6 further comprising a mechanical fastener securing the stop to the seat.

8. The household appliance of claim 1, wherein the stop is a vibration dampener.

9. The household appliance of claim 1, wherein the stop has a surface complementary to an edge of the windowpane.

10. A household appliance comprising:
a cabinet defining an interior and having a wall with an access opening;
a treating chamber located within the interior;
a lid assembly selectively closing the access opening and comprising:
a frame having a channel with a predetermined cross-sectional shape and a front and a rear connected by opposing sides to define a window opening, and having panel guides on the opposing sides and rear to define a panel slot facing the front;
a windowpane slidably received within the panel guides, through the panel slot, and in abutting contact with at least a portion of the panel guide on the rear;
at least one stop slidably mounted to the front and having a portion with a complementary cross-sectional shape to the channel, and the portion is slid into the channel in abutting contact with the windowpane to compressively retain the windowpane between the panel guide on the rear and the stop; and
a cover mounted to the frame and overlying the at least one stop.

11. The household appliance of claim 10, wherein the cover snap-fits to the frame.

12. The household appliance of claim 11, further comprising alignment elements on the cover and the frame to align the cover on the frame.

13. The household appliance of claim 10 wherein the frame has a seat and the stop is received within the seat.

14. The household appliance of claim 13 further comprising a mechanical fastener securing the stop to the seat.

15. The household appliance of claim 10, wherein the stop is a vibration dampener.

16. The household appliance of claim 10, wherein the stop has a surface complementary to an edge of the windowpane.

* * * * *